(12) United States Patent
Kobusch et al.

(10) Patent No.: US 7,303,699 B2
(45) Date of Patent: Dec. 4, 2007

(54) METHOD FOR PRODUCING A SCINTILLATOR CERAMIC

(75) Inventors: Manfred Kobusch, München (DE); Wolfgang Rossner, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 511 days.

(21) Appl. No.: 10/468,736

(22) PCT Filed: Feb. 13, 2002

(86) PCT No.: PCT/DE02/00516

§ 371 (c)(1),
(2), (4) Date: Aug. 22, 2003

(87) PCT Pub. No.: WO02/066398

PCT Pub. Date: Aug. 29, 2002

(65) Prior Publication Data

US 2004/0100000 A1    May 27, 2004

(30) Foreign Application Priority Data

Feb. 22, 2001   (DE) .................. 101 08 553

(51) Int. Cl.
*C04B 33/32* (2006.01)
*C04B 35/50* (2006.01)
(52) U.S. Cl. .............. 264/1.22; 264/21; 264/667
(58) Field of Classification Search ............ 264/1.22, 264/21, 102, 667, 910, 301.4 R, 301; 501/152
See application file for complete search history.

(56) References Cited

U.S. PATENT DOCUMENTS

| | | | |
|---|---|---|---|
| 3,502,590 A | 3/1970 | Royce et al. ............ 252/301.4 |
| 3,994,692 A * | 11/1976 | Rudy ........................ 428/336 |
| 4,242,221 A | 12/1980 | Cusano et al. ........... 252/301.4 |
| 4,421,671 A | 12/1983 | Cusano et al. ........... 252/301.4 |
| 4,624,861 A | 11/1986 | Yale et al. ................ 427/65 |
| 4,755,492 A * | 7/1988 | Greskovich et al. ........ 501/126 |
| 5,116,560 A * | 5/1992 | Dole et al. ................ 264/1.22 |
| 5,296,163 A * | 3/1994 | Leppert et al. ........ 252/301.4 S |
| 5,484,750 A * | 1/1996 | Greskovich et al. .......... 501/86 |

FOREIGN PATENT DOCUMENTS

| | | |
|---|---|---|
| DE | 36 29 180 A1 | 3/1987 |
| DE | 37 02 357 C2 | 8/1987 |
| DE | 42 24 931 A1 | 2/1994 |
| DE | 42 24 931 C2 | 2/1994 |
| DE | 44 02 258 A1 | 7/1995 |
| DE | 44 02 260 A | 7/1995 |
| DE | 199 13 550 A1 | 9/2000 |
| JP | 61-183437 A | 8/1986 |

(Continued)

*Primary Examiner*—Carlos Lopez
(74) *Attorney, Agent, or Firm*—Harness, Dickey & Pierce, P.L.C.

(57) ABSTRACT

A method for producing high-density, translucent, scintillator ceramics by way of a pressure-less sintering carried out at an elevated temperature. According to the method, particles of a MOS composition are prepared using a specific wet milling method whereby being reduced, in particular, to a particle size of less than 10 μm. The particles are compacted to form compacted bodies with green densities of up to 50% and higher. The sintering may be carried out under specific sintering parameters.

20 Claims, 6 Drawing Sheets

FOREIGN PATENT DOCUMENTS

| | | |
|---|---|---|
| JP | 03-294401 A | 12/1991 |
| JP | 05-320816 A | 12/1993 |
| JP | 06-309619 A | 11/1994 |
| JP | 07-082025 A | 3/1995 |
| JP | 08-060148 | 3/1996 |
| JP | 2000-143352 A | 5/2000 |

* cited by examiner

METHOD FOR PRODUCING A SCINTILLATOR CERAMIC

This application is the national phase under 35 U.S.C. § 371 of PCT International Application No. PCT/DE02/00516 which has an International filing date of Feb. 13, 2002, which designated the United States of America and which claims priority on German Patent Application number DE 101 08 553.2 filed Feb. 22, 2001, the entire contents of which are hereby incorporated herein by reference.

FIELD OF THE INVENTION

The present invention relates to the production of a high-density, translucent scintillator ceramic based on metal oxysulfides (MOS) and the use thereof.

BACKGROUND OF THE INVENTION

Scintillator ceramics or bodies are used for identifying high-energy radiation such as X-rays, gamma rays and electron beams. These bodies contain a luminescent material which absorbs the high-energy radiation and converts it into visible light. The luminescent radiation produced thereby is electronically detected and evaluated using light-sensitive systems such as photodiodes or photomultipliers.

For highly sensitive radiation detectors such as are required, for example, in X-ray computer tomography, scintillator ceramics made from pigment powders of the rare earth oxysulfides are known which obey the generic formula

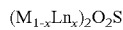
$(M_{1-x}Ln_x)_2O_2S$

These are therefore metal oxysulfides (MOS) which have been doped with specific rare earth elements (Ln). In the generic formula, M stands for Y, La and/or Gd and Ln for an element from the group Eu, Ce, Pr, Tb, Yb, Dy, Sm and/or Ho.

For a high light yield when converting the high-energy radiation, the scintillator ceramic must be optically translucent to transparent in order to ensure high transmittance of the luminescent radiation. A high quantum efficiency is additionally required for the conversion. An excessively high afterglow is undesirable.

A high degree of transparency of the scintillator body can only be achieved with a high-density ceramic having an extremely low residual porosity. Optimum transmission of the luminescent radiation is adversely affected not only by crystal anisotropy of the optical refractive index but also by secondary phase inclusions as well as grain boundaries and, in particular, voids.

To produce an optimum scintillator ceramic, a metal oxysulfide powder of the appropriate (required) composition must be transformed into a compacted powder body which is then densified by sintering at elevated temperatures to form a ceramic that is as void-free as possible. As the metal oxysulfides chemically decompose at high temperatures, the sintering result cannot be sufficiently optimized by simply increasing the sintering temperature. This disadvantage can be largely compensated by applying mechanical pressure during the sintering process.

Corresponding pressure sintering technologies are used for producing high-transparency scintillator ceramics from metal oxysulfides. DE 36 29 180 A1 and DE 37 02 357 C2 describe the production of scintillator bodies wherein hot isostatic pressing is used during the sintering process. The operations involved here are very complex and the procurement costs for the apparatus required are also relatively high.

By considerably increasing the specific surface area of the starting powder from <1 m²/g to >10 m²/g, it has been possible to increase the sintering activity in the powder body to the point that expensive hot isostatic pressing has been able to be replaced by less expensive uniaxial pressing. The individual process conditions involved are described in DE 42 24 931 C2. Because of the way in which the metal oxysulfide powders used are produced, the particles of these more sinter active powders consist of a large number of primary particles which form stable, hard and porous agglomerates or aggregates with particle sizes of between 30 and 85 µm. This results primarily in relatively low and inhomogeneous bulk densities, i.e. density gradients occur in the powder body so that pressure-assisted sintering is required.

A disadvantage common to sintering assisted by hot isostatic pressing and sintering assisted by hot uniaxial pressing is that for economic reasons it is only possible to produce comparatively large ceramic blocks which then have to be split up into smaller components by means of expensive and time-consuming cutting and sawing operations. This can result in considerable material losses of up to 50% of the original material.

The existing manufacturing processes for scintillator ceramics therefore require high capital investment for the machinery required and involve considerable process costs.

SUMMARY OF THE INVENTION

An object of the present invention is to specify a less costly method for densifying pigment powders of rare earth oxysulfides wherein the ceramic can be produced as geometrically precisely as possible while retaining the good properties of the currently known scintillator ceramics.

An object of the present invention is achieved by a method for producing a high-density, translucent scintillator ceramic.

Gadolinium oxysulfides (GOS) having a specific surface area of 10 m²/g are preferably used. As the production of said gadolinium oxysulfides is described in detail in DE 42 24 931 C2, it will only be referred to at this juncture.

The milling fluid used in the wet milling technology employed is of organic origin and these fluids are selected from ethanol, isopropanol, benzine and cyclohexane. Preferably selected are in particular non-aqueous, non-polar fluids having a low viscosity. Of these, dried benzine is preferably used as the milling fluid, it having been found that the surfaces newly formed by comminution absorptively passivate these fluids. This prevents, for example, oxidation of the surfaces which could result in reorganization of the entire crystal structure and therefore unwanted inclusions in the end product.

In a particular embodiment, granulation of the powder to a free-flowing, soft granulated powder from which the powder body is subsequently produced is performed after wet milling by draining off the milling fluid to leave a residual moisture of 0.01 to 5 wt. % inclusive.

Granulation of the MOS powder obtained is preferably also performed without binders. This ensures that the end product is free from other unwanted secondary phase inclusions which could affect its density or porosity. The powder granulation used has the added advantage that a free-flowing intermediate is produced which can be further processed largely dust-free.

The granulate or granulated powder to be produced advantageously has a granule size of 0.1 to 1 mm, the granule density being, for example, 30%. A compact which is produced by compressing the powder is specifically used as the powder body, the granulated powder being preferably used as the powder.

This granulate allows a compact with a basic density of 40 to 60% or higher to be produced, the basic density being preferably 45 to 55% A compacting pressure of between 50 and 140 MPa can be selected.

To increase the green density, which is advantageous for the subsequent sintering operation, cold isostatic pressing at up 300 MPa can then take place which increases the green density to >50%, the density homogeneity being <1%. The compact can also be produced directly by cold isostatic pressing in the specified pressure ranges.

The sintering process is generally performed in vacuum. It has been found advantageous to perform further processing in an inert gas atmosphere after the main densification phase. The inert gas is then preferably argon. If necessary it is also possible to continue processing in a reactive atmosphere containing e.g. sulfur or hydrogen sulfide.

It has additionally been found advantageous to set the heating rate of the sintering process to <3 K/min as soon as a temperature of 800° C. has been reached, until the maximum temperature is attained. This achieves the optimum results for the scintillator ceramics produced.

The maximum sintering temperature is preferably between 1350 and 1450° C. The heating rate can be selected between 0.1 and 5 K/min, the best results being obtained with a heating rate of 1 K/min, a maximum sintering temperature of 1380° C. and a residence time of 3 hours. The relative density of the ceramic produced thereby is 99.5% or higher.

According to another aspect of the invention, the scintillator ceramic described above is used for detecting energetic radiation. The energetic radiation can include electromagnetic radiation (γ, X-ray, UV radiation) or particle radiation. The scintillator ceramic can be used in X-ray computer tomography (CT) for detecting X-radiation.

BRIEF DESCRIPTION OF THE DRAWINGS

Exemplary embodiments of the present invention will now be described in greater detail with reference to the accompanying drawings.

DETAILED DESCRIPTION OF THE PREFERRED EMBODIMENTS

Figure 1B:
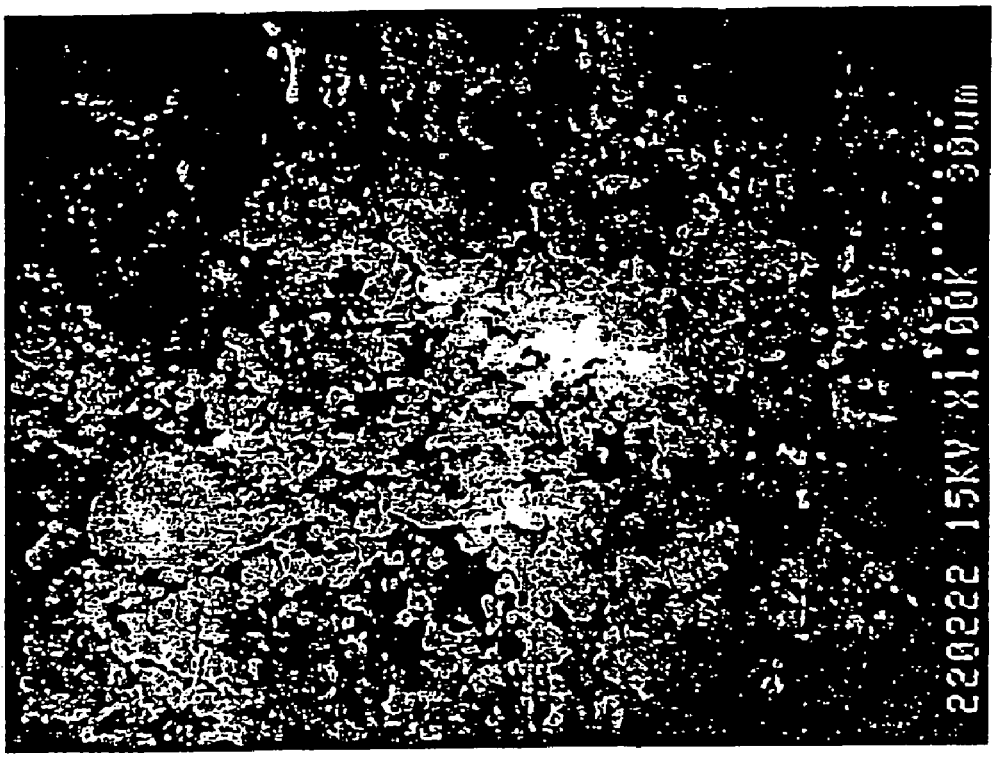
FIG. 1b shows a GOS powder which has been milled for 20 hours in the presence of dried benzine.
Figure 1A:
FIG. 1a shows an untreated unmilled GOS powder.
Figure 1C:
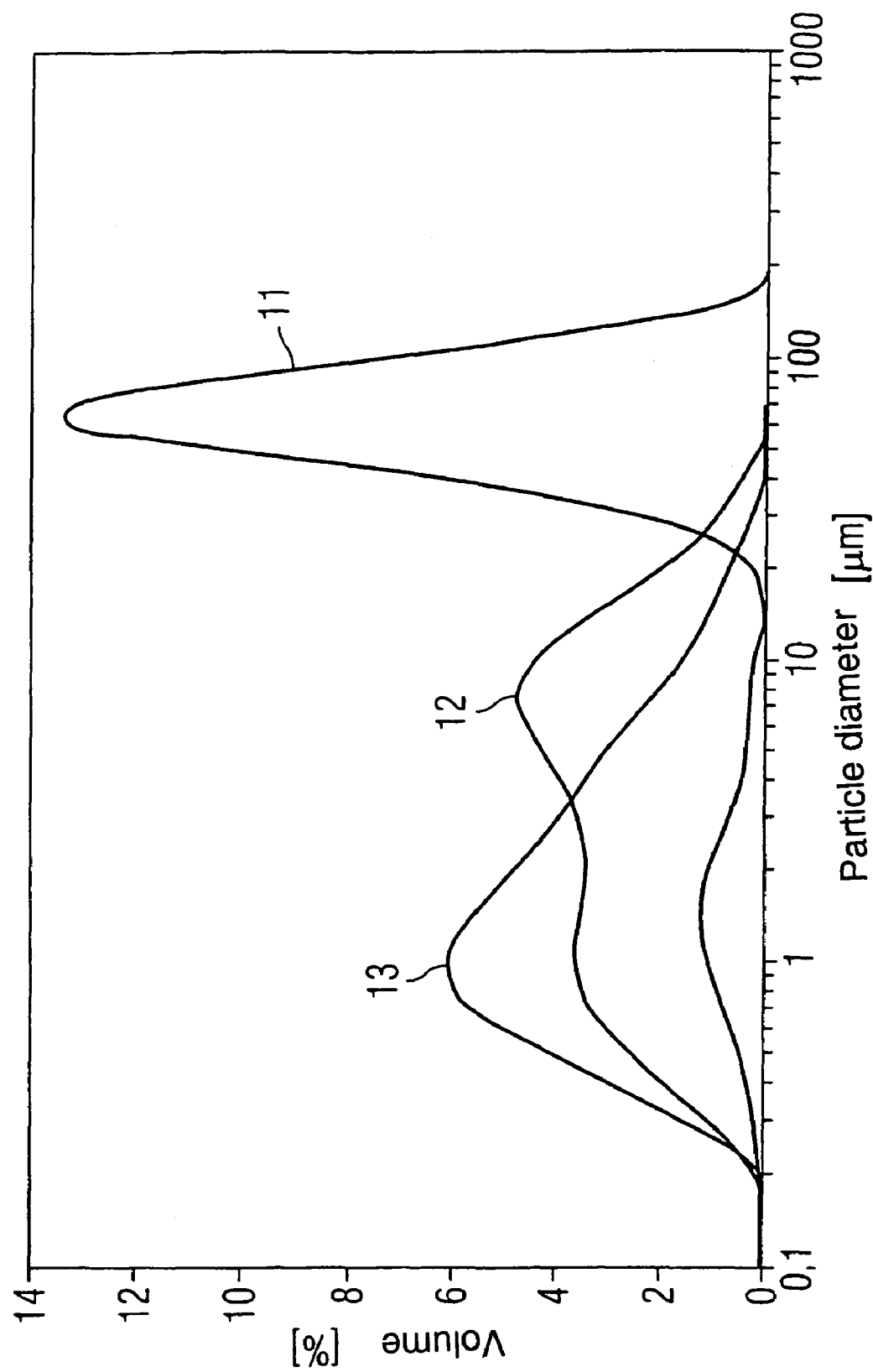
FIG. 1c shows a powder size distribution of the untreated and unmilled powder.

FIGS. 1a and 1b show the powder morphology of a GOS material before and after treatment in a wet milling process with the addition of organic milling fluid, from which it clearly emerges that the particle size of the GOS has been markedly reduced, namely to <10 μm. In the exemplary embodiment shown, the wet milling process with benzine added as milling fluid was carried out for 19 hours. FIG. 1c shows the powder size distribution of the GOS material. Without treatment (11) the average particle size is about 100 μm. The wet milling process reduces the average particle size to <10 μm (12, milling time 19 hours, 13, milling time 67 hours).

Figure 2:
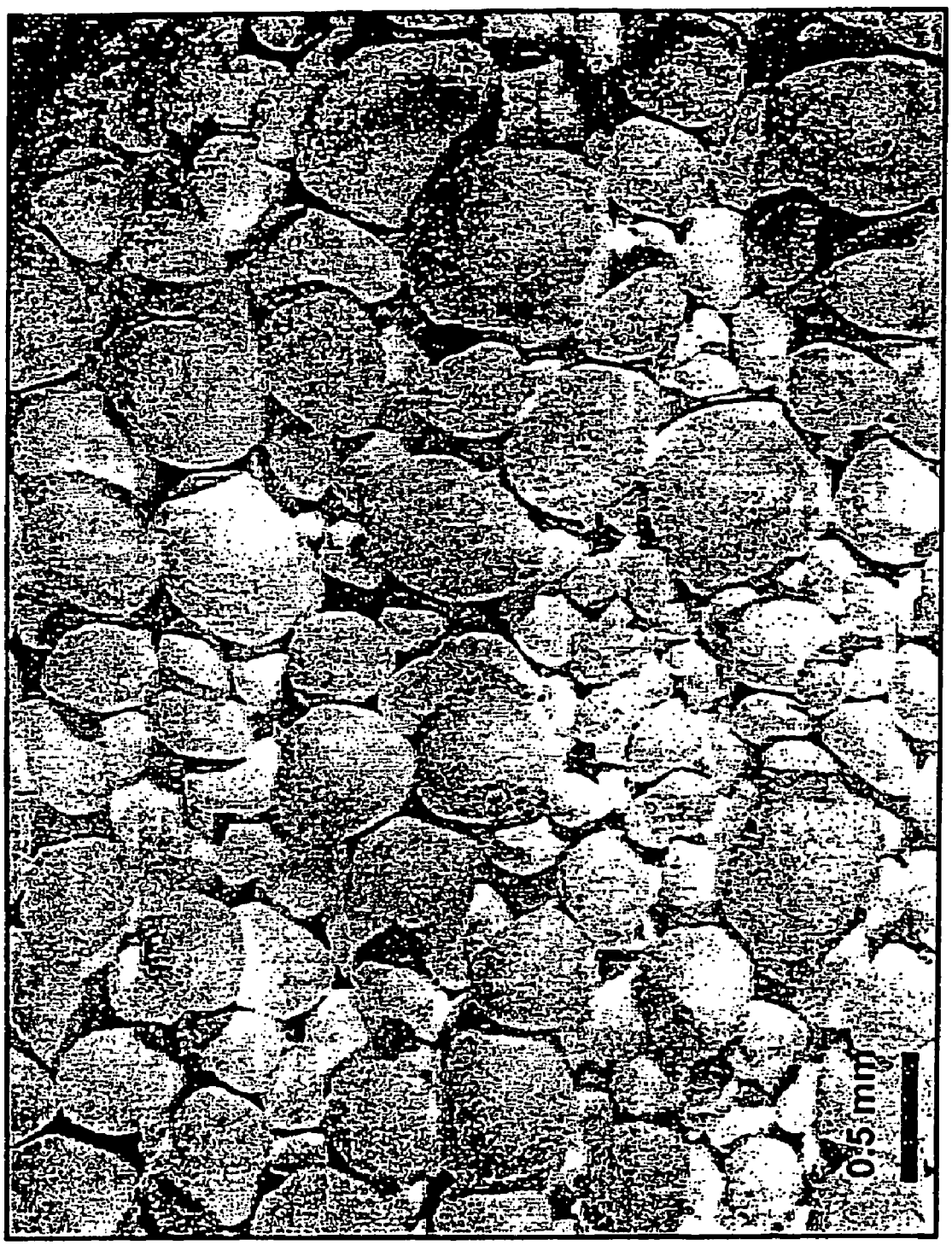
FIG. 2 shows the morphology of an exemplary GOS granulate, produced using a rotation evaporator method.

FIG. 2 shows the morphology of a GOS granulate produced by a rotation evaporator process. This granulate is soft and free-flowing due to its largely homogeneous granule size.

Figure 3:
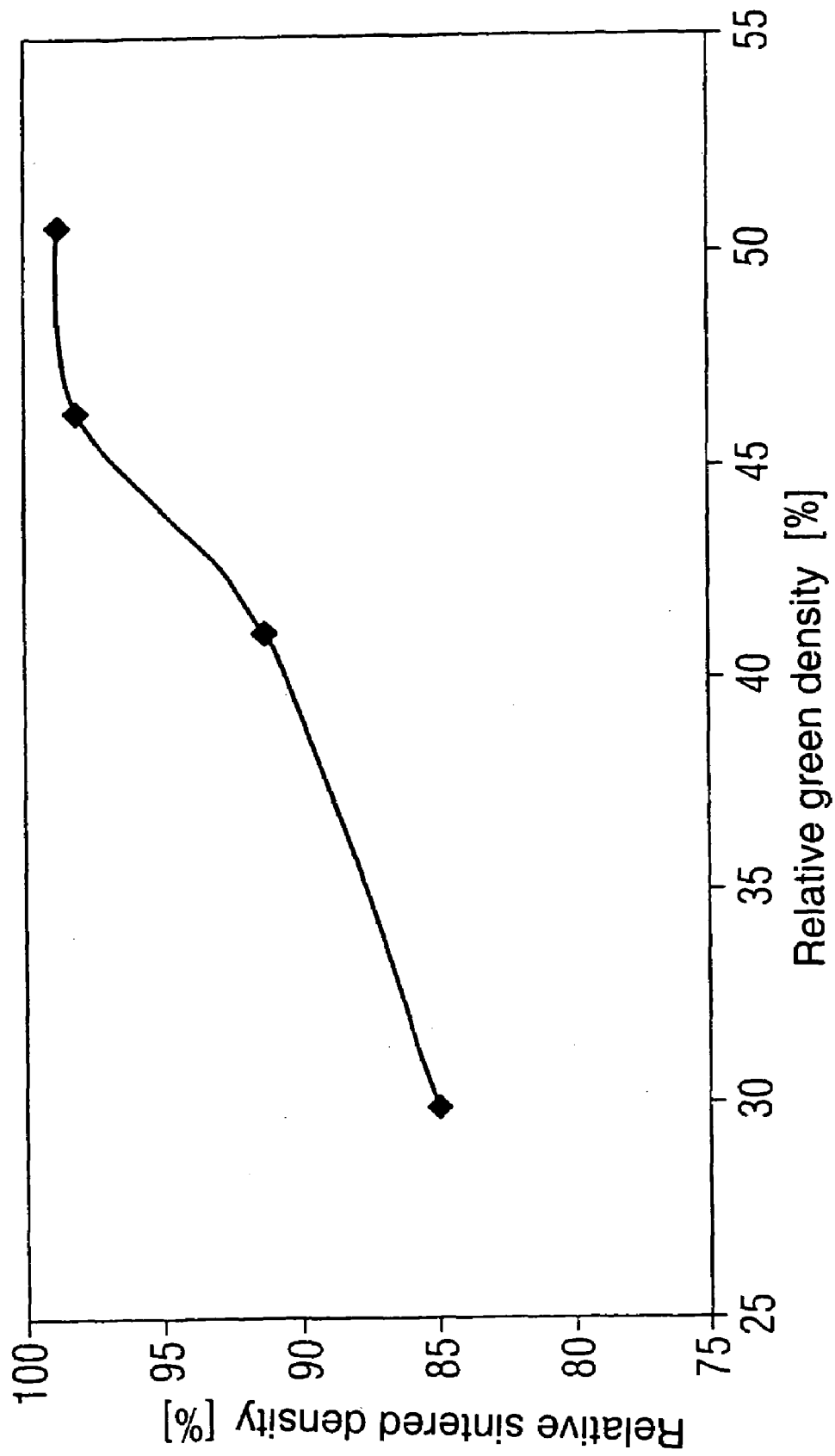
FIG. 3 shows the relative sintered density as a function of the relative green density.

This particle size distribution of the powder obtained is important for the compacts produced from the powder or its relative green density, as the relative sintered density of the end product depends on it. This relationship is shown in FIG. 3 from which it can be seen that, with increasing relative green density, the achievable relative sintered density also increases up to a limit value.

Figure 4A:
FIGS. 4a and b show the microstructure of GOS ceramics pressurelessly sintered under different conditions.
Figure 4B:
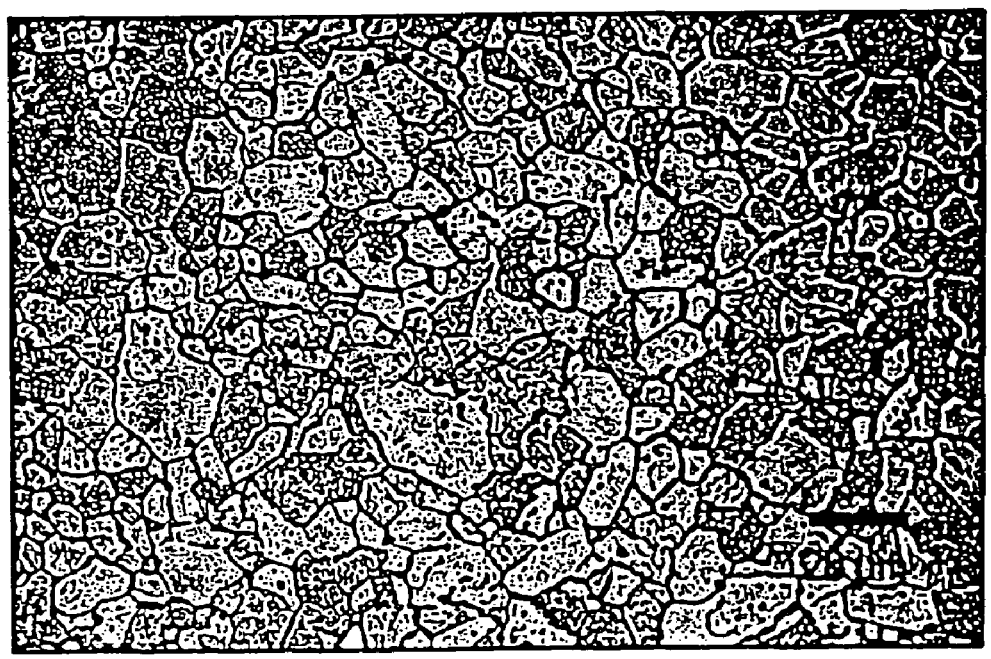

Also critical for the relative sintered density of the end product, i.e. the scintillator ceramic, is the heating rate and ultimately the residence time once the optimum maximum temperature has been reached. In this connection, FIG. 4 illustrates the microstructure of GOS ceramics pressurelessly sintered under different conditions, FIG. 4b showing the microstructure of a GOS ceramic with a heating rate of 2.8 K/min to 1300° C. and a residence time of 3 hours and FIG. 4a showing the microstructure of a pressurelessly sintered GOS ceramic of the same composition and identical handling with a heating rate of 1.0 K/min to 1380° C. and a residence time of 6 hours. This indicates that the fineness of the microstructure is essentially dependent on the heating rate, the maximum temperature and the residence time.

For the GOS starting material used in the method, reference will be made regarding its production expressly to the relevant description in DE 42 24 931 C2, according to which specifically a gadolinium oxysulfide with a specific surface area of >10 m$^2$/g, in particular between 20 m$^2$/g and 50 m$^2$/g, typically 35 m$^2$/g, is produced.

A particle-friendly milling process with low energy input is used for powder preparation. Wet milling is performed using the milling fluids specified above, specifically benzine, using conventional ball milling. In this process the original powder aggregates in the milling suspension are broken up between the milling balls by shear forces, the interaction frequency being low and virtually no thermal stressing of the particle surface taking place.

The milling is performed in a 500 ml polyamide ball mill. For this purpose 100 g of GOS powder of the specified origin is mixed with 200 ml of dried benzine. 9 balls measuring 15.5 mm in diameter and 27 balls measuring 10 mm in diameter made of zirconium dioxide are added and the sealed container is rotated on a roller mill.

At the end of the milling time, the milling fluid is removed. The powder obtained is then converted into a powder granulate in order to ensure dust-free further processing and good flowability for the subsequent pressing. The use of binders for granulation is avoided in order to prevent oxidation of the GOS material due to thermal decomposition of the binder and secondary phase inclusion during sintering.

A rotation evaporator method is used for drying the milling suspension and for pelletizing. For this purpose, a 500 ml rotation evaporator flask is filled with the suspension obtained following comminution. Residues of the milled powder are flushed into to flask with dried benzine. The flask is then first evacuated three times to 150 mbar and purged with nitrogen in each case in order to remove atmospheric oxygen from the apparatus. Then a pressure of 150 mbar is applied and the flask contents are heated to 60° C. by means of a water bath, the powder forming approximately 1 mm diameter granules as shown in FIG. 2. The last portion of the solvent (benzine) is removed by heating to 70° C. at a residual pressure of 50 mbar and the powder is dried.

For the subsequent preliminary pressing of the powder, care is advantageously taken to ensure that a residual moisture of about 1% is retained because the powder then possesses better slide characteristics and can be better densified. This enables cracks in the green body to be prevented when the compact is formed in the subsequent operation.

The shaping and predensification of the granulates produced is performed by uniaxial dry pressing. Alternatively cold isostatic pressing can be used.

40 g of granulate is evenly loaded into a steel die with an internal diameter of 50 mm. To ensure that predensification is as homogeneous as possible, it is shaken in for 5 minutes on a vibrating table with the plunger placed on top. The thus prepared powder load is then compressed under a hand press at a pressure of between 50 and 140 MPa and, after a waiting time of 15 minutes, the pressure is slowly released in order to allow compressed air to escape. To maximize the green density the resulting powder bodies can be subsequently redensified using cold isostatic pressing at up to 300 MPa. For this purpose the green body formed by uniaxial pressing, e.g. with a green density of approximately 40%, is welded into a foil tube under vacuum and then pressed in the water-filled pressure chamber of an isostatic press using a special pressure loading and release program.

The achievable green density is shown to be dependent on the compacting pressure and the pressing method. The subsequent cold isostatic pressing process enables the green density to be increased to just over 50%.

The optimal green density for sintering can be seen from FIG. 3 which shows the relative sintered density as a function of the relative green density. For green densities greater than approximately 47%, the sintered density achieved at a sintering temperature of 1300° C. and a sintering time of 2 hours is around 99% and cannot be significantly improved by increasing the green density still further. Increasing the sintered density to the target of 100% must be achieved by the sintering process itself.

For sintering, the green body produced is heated under vacuum in a sintering furnace, the vacuum being set to approximately 0.15 mbar. The green body is first heated to approximately 800° C. at 5.3 K/min and then brought to the maximum sintering temperature at the required heating rate for the application. After a residence time of 1 to 3 hours it is cooled down at the intrinsic cooling rate of the furnace. At a furnace temperature of 700° C., aeration is performed using an inert gas, in this case argon. When the furnace has cooled down to approximately 150° C., the sintered product is removed.

The sintered compact shows a closed porosity and the sintered density therefore has to be measured using a special gas pycnometer allowing a measurement accuracy of approximately 0.01%.

In addition to the sintered density, the grain structure is of course also dependent on the sintering conditions, i.e. the temperature/time integral. FIG. 4 shows two typical grain photographs. Both microstructures exhibit a globular, virtually equiaxial grain shape. Discernable in the grains are individual residual pores accounting for <0.5% by volume.

The effect of varying sintering parameters on the resulting scintillator properties was tested on produced green bodies all having an identical GOS composition. These sintering parameters consist in the heating time from 800° C. to $T_{max}$, the heating rate, the residence time and the maximum temperature set. Specified values are the relative density of the sintered product produced, the afterglow, the light yield and the drift. The samples labeled T were baked for 10 hours at 800° C.

The results listed in the table indicate that the light yield increases with increasing sintering temperature and decreasing heating rate, which is attributable on the whole to improved optical transparency (better sintering). The afterglow values (log $I/I_0$) rise with increasing sintering temperature and heating rate, but can be improved by baking to values around −4.0. The drift values show no marked dependencies.

Figure 5:
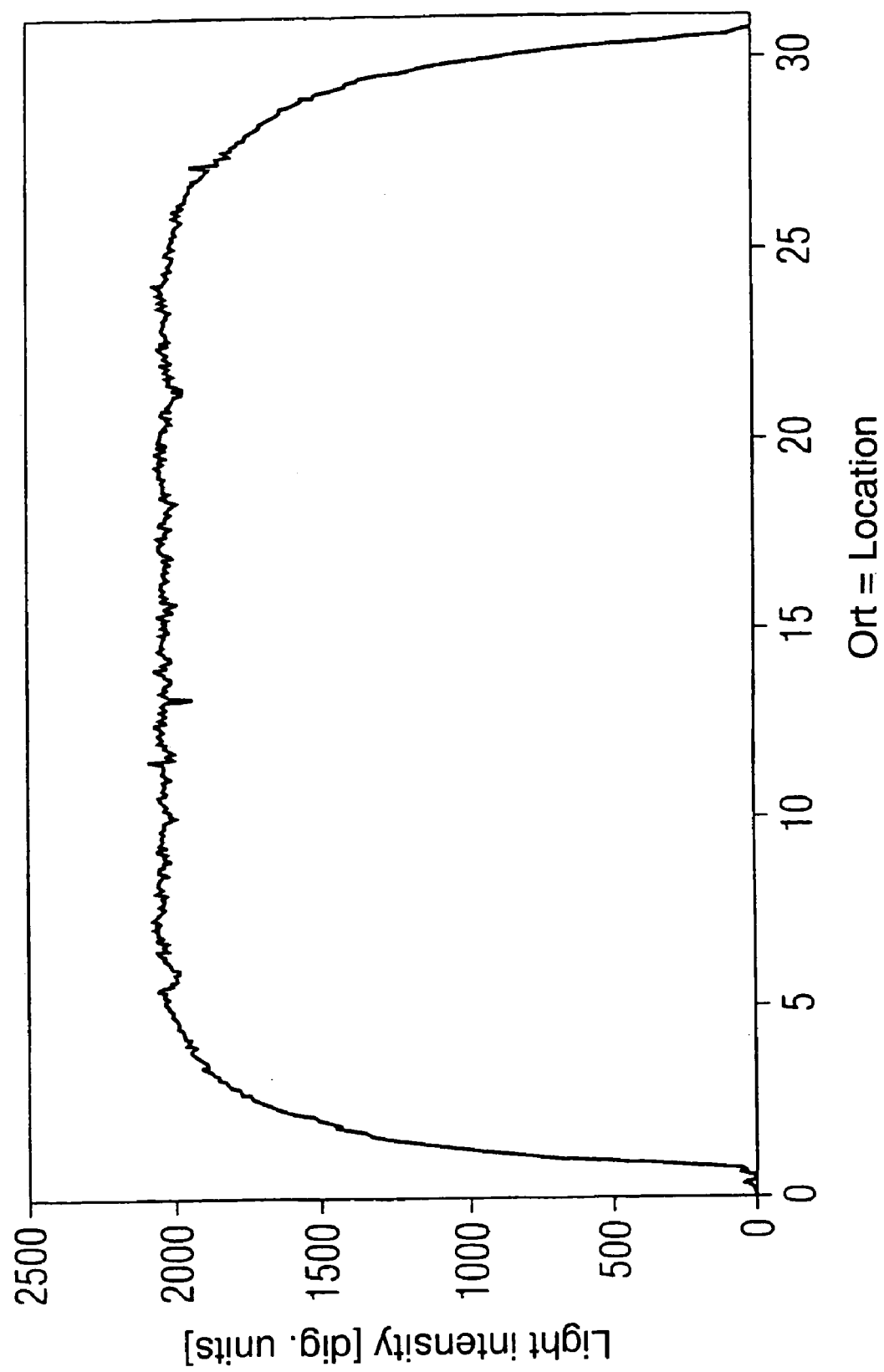
FIG. 5 shows typical light yields of pressurelessly sintered GOS ceramics.

Light yields of up to approximately 87% from hot-pressed scintillator ceramic (afterglow values (F1)=−4.0 and (F2)=−4.6 as well as drift of approximately 7 GE) could be measured on baked samples. FIG. 5 shows a light yield profile of a GOS disk X-ray irradiated over its whole surface and exhibiting a noticeable luminescence and transmission homogeneity.

The results achieved demonstrate that pressureless sintering enables GOS ceramics to be produced that are on a par with hot-pressed GOS ceramics in terms of scintillator properties. It can be concluded from the available measurement data that, contrary to previous expectations, powder preparation by controlled milling together with pressureless sintering at elevated temperatures cause no dramatic impairments in the scintillator characteristics.

Although the example described above relates to gadolinium oxysulfide, the present invention is not limited to this embodiment. It is anticipated that other metal oxysulfides exhibiting equally favorable scintillator properties can also be produced.

TABLE

Scintillator properties of GOS ceramics pressurelessly sintered under different conditions

| Sample | Heating time 800° C.-$T_{max}$ [hours] | Heating rate [K/min] | Residence time [hours] | Max. temp. [° C.] | Rel. density [%] | Afterglow (F1) | Light yield [% HP] | Drift |
|---|---|---|---|---|---|---|---|---|
| 990120V2 | 7 | 1.31 | 3 | 1350 | 98.8 | −3.5 | 75 | 8.5 |
| 990209V | 7 | 1.31 | 3 | 1350 | 98.6 | −3.7 | 79 | 8.0 |
| 990211V | 10 | 0.92 | 3 | 1350 | 98.7 | −4.0 | 82 | (3.3) |
| 990212V | 14 | 0.66 | 3 | 1350 | 98.8 | −3.9 | 83 | 8.7 |
| 990210V | 7 | 1.36 | 3 | 1370 | 99.0 | −3.4 | 85 | 8.7 |
| 990224V | 10 | 0.97 | 3 | 1380 | 98.8 | −3.9 | 80 | |

TABLE-continued

Scintillator properties of GOS ceramics pressurelessly sintered under different conditions

| Sample | Heating time 800° C.-$T_{max}$ [hours] | Heating rate [K/min] | Residence time [hours] | Max. temp. [° C.] | Rel. density [%] | After-glow (F1) | Light yield [% HP] | Drift |
|---|---|---|---|---|---|---|---|---|
| 990218V | 10 | 1.00 | 3 | 1400 | 99.2 | −3.85 | 85 | 3.1 |
| 990226V | 10 | 1.00 | 10 | 1400 | 98.9 | −3.5 | 85 | |
| 990301V | 10 | 0.97 | 3 | 1380 | 98.8 | −3.8 | 86 | |

The invention claimed is:

1. Method for producing a high-density, translucent scintillator ceramic, the method comprising:

doping a metal oxysulfide (MOS) with specific rare earth elements (Ln), wherein the metal oxysulfide (MOS) has the generic formula (I)

$(M_{1-x}Ln_x)_2O_2S$           Formula (I)

wet milling a powder of the doped metal oxysulfide with the addition of an organic milling fluid until a particle size of the powder is <10 μm, wherein the powder has a specific surface area of 10 m²/g;

producing a powder body from the powder, wherein the powder body has a green density selected from the range 40% to 60% inclusive; and pressurelessly sintering the powder body obtained is in vacuum or in an inert gas atmosphere at a sinter temperature between 1200 to 1450° C. inclusive.

2. The method according to claim 1, wherein
the generic formula (I) M is at least one element selected from the group consisting of Y, La and Gd, and
Ln is at least one element selected from the group consisting of Eu, Co, Pr, Tb, Dy, Sm and Ho.

3. The method according to claim 1, wherein pressurelessly sintering of the powder body includes pre-heating to approximately 800° C., heating to a maximum temperature at a heating rate of <3 K/min and maintaining the maximum temperature for at least 1 hour, the maximum temperature being >1200° C.

4. The method according to claim 1, wherein the organic milling fluid is a non-aqueous, non-polar fluid with low viscosity selected from the group consisting of ethanol, isopropanol, benzine and cyclohexane.

5. The method according to claim 4, wherein benzine includes dried benzine.

6. The method according to claim 1, further comprising forming a free-flowing, soft granulated powder by removing the organic milling fluid down to a residual moisture of 0.01 to 5 wt. % inclusive to granulate the powder of the metal oxysulfide, after wet milling, and
further wherein producing the powder body includes forming the powder body from the free-flowing, soft granulated powder.

7. The method according to claim 6, wherein granulation is performed without adding a binder.

8. The method according to claim 6, wherein granulation includes forming a granulate with a grain size of 0.1 to 1 mm.

9. The method according to claim 1, wherein producing the powder body includes pressing the powder to form a compact.

10. The method according to claim 9, wherein pressing is performed uniaxially at a pressure of between 50 and 140 MPa and isostatically at a pressure of up to 300 MPa.

11. The method according to claim 1, wherein pressurelessly sintering the powder body includes completing a main densification phase under argon or a reactive atmosphere.

12. The method according to claim 1, wherein pressurelessly sintering includes setting a heating rate to 1 to 3 K/min at an in-process temperature of approximately 800° C. or greater.

13. The method according to claim 1, wherein the sinter temperature is between 1350 and 1450° C.

14. The method according to claim 12, wherein the heating rate is 1 K/min, the sinter temperature is 1380° C. and a residence time is 3 hours.

15. The method according to claim 2, wherein the organic milling fluid is a non-aqueous, non-polar fluid with low viscosity selected from the group consisting of ethanol, isopropanol, benzine and cyclohexane.

16. The method according to claim 3, wherein the organic milling fluid is a non-aqueous, non-polar fluid with low viscosity selected from the group consisting of ethanol, isopropanol, benzine and cyclohexane.

17. The method according to claim 7, wherein granulation includes forming a granulate with a grain size of 0.1 to 1 mm.

18. The method according to claim 9, wherein pressing is performed uniaxially at a pressure of between 50 and 140 MPa or isostatically at a pressure of up to 300 MPa.

19. The method according to claim 11, wherein the reactive atmosphere includes sulfur or hydrogen sulfide.

20. A method for producing a high-density, translucent scintillator ceramic, the method comprising:

doping a metal oxysulfide (MOS) with specific rare earth elements (Ln), wherein the metal oxysulfide (MOS) has the generic formula (I)

$(M_{1-x}Ln_x)_2O_2S$           Formula (I)

wet milling a powder of the doped metal oxysulfide with the addition of an organic milling fluid until a particle size of the powder is <10 μm, wherein the powder has a specific surface area of 10 m²/g;

producing a powder body from the powder, wherein the powder body has a green density selected from the range 40% to 60% inclusive; and pressurelessly sintering the powder body obtained is in vacuum or in an inert gas atmosphere at a sinter temperature between 1200 to 1450° C. inclusive, wherein the high-density, translucent scintillator ceramic has a relative density of 99.5% or higher.

* * * * *